（12）United States Patent
Brochu

(10) Patent No.: US 11,200,737 B2
(45) Date of Patent: *Dec. 14, 2021

(54) ADAPTIVE MESH NON-REGULARIZED BOOLEANS

(71) Applicant: AUTODESK, INC., San Rafael, CA (US)

(72) Inventor: Tyson Brochu, Vancouver (CA)

(73) Assignee: AUTODESK, INC., San Rafael, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/823,187

(22) Filed: Mar. 18, 2020

(65) Prior Publication Data
US 2020/0219317 A1 Jul. 9, 2020

Related U.S. Application Data

(63) Continuation of application No. 15/809,977, filed on Nov. 10, 2017, now Pat. No. 10,600,242.

(51) Int. Cl.
*G06T 17/20* (2006.01)
*G06T 19/20* (2011.01)

(52) U.S. Cl.
CPC ............ *G06T 17/205* (2013.01); *G06T 17/20* (2013.01); *G06T 19/20* (2013.01); *G06T 2219/2008* (2013.01); *G06T 2219/2021* (2013.01)

(58) Field of Classification Search
CPC ......... G06T 17/00–30; G06T 19/00–20; G06T 2219/2008; G06T 2219/2021; G06F 17/50; G05B 19/4097; G05B 19/4099
See application file for complete search history.

(56) References Cited

U.S. PATENT DOCUMENTS

2013/0300736 A1* 11/2013 Schmidt ................ G06T 17/20
345/419
2017/0050381 A1* 2/2017 Minardi ............... B29C 64/118

OTHER PUBLICATIONS

Schmidt, Ryan, and Tyson Brochu. "Adaptive mesh booleans." arXiv preprint arXiv:1605.01760 (Submitted to publicly accessible arXiv online database on May 5, 2016). (Year: 2016).*
Da, Fang, Christopher Batty, and Eitan Grinspun. "Multimaterial mesh-based surface tracking." ACM Transactions on Graphics (TOG) 33.4 (2014): 112. (Year: 2014).*

(Continued)

*Primary Examiner* — Daniel F Hajnik
(74) *Attorney, Agent, or Firm* — Artegis Law Group, LLP

(57) ABSTRACT

One embodiment of the present application sets forth a computer-implemented method for generating a three-dimensional (3D) surface model. The method includes joining a first 3D object having a first closed surface mesh and a second 3D object having a second closed surface mesh to produce an irregular surface mesh. The method further includes computing a first intersection contour for the irregular surface mesh. The method further includes removing at least one portion of the irregular surface mesh proximate to the first intersection contour to produce a first boundary. The method further includes growing the first boundary towards at least one other boundary. The method further includes connecting the first boundary to the at least one other boundary to produce a portion of a non-manifold surface mesh that comprises at least a portion of the 3D surface model.

16 Claims, 7 Drawing Sheets

(56) References Cited

OTHER PUBLICATIONS

Borodin, Pavel, Marcin Novotni, and Reinhard Klein. "Progressive gap closing for mesh repairing." Advances in Modelling, Animation and Rendering. Springer, London, 2002. 201-213. (Year: 2002).*
Da, Fang, Christopher Batty, and Eitan Grinspun. "Multimaterial front tracking." CoRR, vol. abs/1306.3113 (2013). (Year: 2013).*
Pernot et al., "Filling holes in meshes using a mechanical model to simulate the curvature variation minimization", doi:10.1016/j.cag.2006.08.020, Computers & Graphics, vol. 30, No. 6, 2006, pp. 892-902.
Attene et al., "ReMESH: An Interactive Environment to Edit and Repair Triangle Meshes", IEEE International Conference on Shape Modeling and Applications 2006 (SMI'06), IEEE, 2006, 6 pages.
Narain et al., "Adaptive Anisotropic Remeshing for Cloth Simulation", https://doi.org/10.1145/2366145.2366171, ACM Transactions on Graphics, vol. 31, No. 6, Article 152, Nov. 2012, pp. 152:1-152:10.
Schneider et al., "Geometric fairing of irregular meshes for free-form surface design", Computer Aided Geometric Design, vol. 18, No. 4, 2001, pp. 359-379.
Dunyach et al., "Adaptive Remeshing for Real-Time Mesh Deformation", Eurographies Short Papers, 2013, pp. 29-32.
Stanculescu et al., "Sculpting multi-dimensional nested structures", https://doi.org/10.1016/j.cag.2013.05.010, Computers &Graphics, vol. 37, No. 6, Oct. 2013, pp. 753-763.
Stanculescu et al., "Freestyle: Sculpting Meshes with Self-Adaptive Topology", Computers and Graphics, vol. 35, No. 3, 2011, pp. 614-622.
Autodesk Inc, "Autodesk Meshmixer", http://www.meshmixer.com, 2010-2015, 3 pages.
Spatial Corp, ACIS, "3D ACIS Modeling", http://www.spatial.com/products/3d-acis-modeling, 2000-2015, 4 pages.
Granados et al., "Boolean Operations on 3D Selective Nef Complexes:Data Structure, Algorithms, and Implementation". Algorithms-ESA, 2003, pp. 654-666.
Hachenberger et al., "Boolean Operations on 3D Selective Nef Complexes:Optimized Implementation and Experiments", Proc. SPM '05, 2005, pp. 163-174.
Bernstein et al., "Fast, Exact, Linear Booleans", Proc. SGP '09, http://dl.acm.org/citation.cfm?id=1735603.1735606, Eurographics Symposium on Geometry Processing 2009, vol. 28, No. 5, 2009, pp. 1269-1278.
Campen et al., "Exact and Robust (Self-)Intersections for Polygonal Meshes", Eurographics 2010, vol. 29, No. 2, 2010, 10 pages.
Wang et al., "Efficient Boundary Extraction of BSP Solids Based on Clipping Operations", IEEE Transactions on Visualization and Computer Graphics, vol. 19, No. 1, Jan. 2013, pp. 16-29.
Bernstein, G. Cork, "Boolean library", https://github.com/gilbo/cork, 2008-2015, 2 pages.

Xu et al., "Fast and robust Booleans on polyhedra", https://doi.org/10.1016/j.cad.2012.10.036, Computer-Aided Design, vol. 45, No. 2, Feb. 2013, pp. 529-534.
Barki et al., "Exact, robust, and efficient regularized Booleans on general 3D meshes", Computers & Mathematics with Applications, vol. 70, Nov. 2, 2015, pp. 1235-1254.
Zhao et al., "Parallel and efficient Boolean on polygonal solids", DOI: 10.1007/s00371-011-0571-1, The Visual Computer, 2011, vol. 27, 2011, pp. 507-517.
Wang, Charlie C.L., "Approximate Boolean Operations on Large Polyhedral Solids with Partial Mesh Reconstruction", DOI:10.1109/TVCG.2010.106, IEEE Transactions on Visualization and Computer Graphics, vol. 17, No. 6, Jun. 2011, pp. 836-849.
Pavic et al., "Hybrid Booleans", DOI: 10.1111/j.1467-8659.2009.01545.x, Computer Graphics Forum, vol. 29, No. 1, 2010, pp. 75-87.
Fryazinov et al., "BSP-fields: An exact representation of polygonal objects by differentiable scalar fields based on binary space partitioning", doi: 10.1016/j.cad.2010.11.011, Computer-Aided Design, vol. 43. No. 3, 2011, pp. 265-277.
Bernstein et al., "Putting Holes in Holey Geometry: Topology Change for Arbitrary Surfaces", https://doi.org/10.1145/2461912.2462027, ACM Transactions on Graphics, vol. 32, No. 4, Article 34, Jul. 2013, pp. 34:1-34:11.
Chentanez et al., "Fast Grid-Free Surface Tracking", https://doi.org/10.1145/2766991, ACM Transactions on Graphics, vol. 34, No. 4, Article 148, Aug. 2015, pp. 148:1-148:11.
Botsch et al., "A Remeshing Approach to Multiresolution Modeling", Proc. SGP '04, 2004, pp. 185-192.
Hoppe et al., "Mesh Optimization", Proc. of the 20th annual conference on Computer graphics and interactive techniques, SIGGRAPH '93, ACM, doi:bibinfofdoigfhttp://doi.acm.org/10.1145/166117.166119g, 1993, pp. 19-22.
Boschiroli et al., "A comparison of local parametric C0 Bezier interpolants for triangular meshes", doi:10.1016jj.cag.2010.09.011, Computers & Graphics, vol. 35, No. 1, 2011, pp. 20-34.
Meyer et al., "Discrete Differential-Geometry Operators for Triangulated 2-Manifolds", VisMath, URL http://www.multires.caltech.edu/pubs/diffGeoOps.pdf, 2002, pp. 1-26.
Jacobson et al., "Robust Inside-Outside Segmentation using Generalized Winding Numbers", ACM Transactions on Graphics, vol. 32, No. 4, Article 33, Jul. 2013, pp. 33:1-33:12.
Barki et al., "Exact, robust, and efficient regularized Booleans on general 3D meshes", https://doi.org/10.1016/j.camwa.2015.06.016, Computers & Mathematics with Aplpications, vol. 70, No. 6, Sep. 2015, pp. 1235-1254.
"CGAL: CGAL User and Reference Manual 4.6.3, ed. CGAL Editorial Board, URL: http://doc.cgal.org/4.6.3/Manual/packages.html", 2015, 41 pages.
Ju et al., "Dual Contouring of Hermite Data", ACM Transactions on Graphics, vol. 21, No. 3, Jul. 2002, pp. 339-346.

* cited by examiner

ADAPTIVE MESH NON-REGULARIZED BOOLEANS

CROSS-REFERENCE TO RELATED APPLICATIONS

This application is a continuation of the co-pending U.S. patent application titled, "ADAPTIVE MESH NON-REGULARIZED BOOLEANS," filed on Nov. 10, 2017 and having Ser. No. 15/809,977. The subject matter of this related application is hereby incorporated herein by reference.

BACKGROUND OF THE INVENTION

Field of the Invention

Embodiments of the present invention relate generally to computer graphics and, more specifically, to adaptive non-regularized Booleans.

Description of the Related Art

Three-dimensional (3D) graphics applications enable users to design and generate 3D surface models for various applications, including video games, special effects, and printing physical articles based on the 3D surface models. Typically, a 3D graphics application can combine multiple 3D objects to generate a 3D surface model. In so doing, the 3D graphics application typically performs various Boolean operations on the multiple 3D objects, where the Boolean operations modify different portions of the 3D objects to generate the 3D surface model as a composite of the multiple 3D objects. For example, the 3D graphics application can combine a first 3D object and a second 3D object to generate a 3D surface model that is the union of the two objects ("A union B").

A significant issue oftentimes experienced with conventional 3D graphics applications is that the polygonal surface meshes of different 3D objects do not align properly. Misalignments can occur, for example, when the polygonal surface meshes of two different 3D objects appear to a designer or to a developer to have the same shape, but, instead, have different polygonal tessellations. In such cases, the polygonal surface meshes of the 3D objects do not align mathematically within the 3D surface model. These misalignments can cause several problems.

First, when the polygonal surface meshes of two different 3D objects do not align properly, the Boolean operations typically implemented by conventional 3D graphics applications cannot be performed accurately on the polygonal surface meshes. When the Boolean operations are not performed accurately, the 3D surface models resulting from the Boolean operations can include errors that are perceived as visual artifacts when the 3D surface models are displayed.

Second, performing Boolean operations on misaligned polygonal surface meshes can add an order of magnitude to the processing times normally required to generate and render 3D surface models from multiple 3D objects.

Third, because of misalignments between the polygonal surface meshes of different 3D objects, most conventional 3D graphics applications require that each 3D surface model be associated with only a single material. However, when designing a 3D surface model, a designer or a developer may wish to include different designated regions within one or more of the polygonal surface meshes within the 3D surface model, where each designated region is associated with a particular material. Accordingly, in order to design a 3D surface model made up of different materials, a designer or developer has to divide the 3D surface model into multiple 3D surface sub-models, where each 3D surface sub-model is associated with a particular material. This requirement adds complexity and tedium to the design process and limits the range of articles that a designer can create using conventional 3D graphics applications.

As the foregoing illustrates, what is needed in the art are more effective techniques for generating 3D surface models made from combinations of multiple 3D objects.

SUMMARY OF THE INVENTION

One embodiment of the present application sets forth a computer-implemented method for generating a three-dimensional (3D) surface model. The method includes joining a first 3D object having a first closed surface mesh and a second 3D object having a second closed surface mesh to produce a first irregular surface mesh. The method further includes computing a first intersection contour for the first irregular surface mesh. The method further includes removing at least one portion of the first irregular surface mesh proximate to the first intersection contour to produce a first boundary. The method further includes growing the first boundary towards at least one other boundary. The method further includes connecting the first boundary to the at least one other boundary to produce a portion of a first non-manifold surface mesh that comprises at least a portion of the 3D surface model.

At least one advantage of the disclosed technique is that the rendering engine enables a 3D graphics application to perform Boolean operations on a broader range of 3D objects. The rendering engine avoids misalignments between closed surfaces by removing and then evolving boundary surfaces that align with each other.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skilled in the art that the present invention may be practiced without one or more of these specific details.

Figure 1:
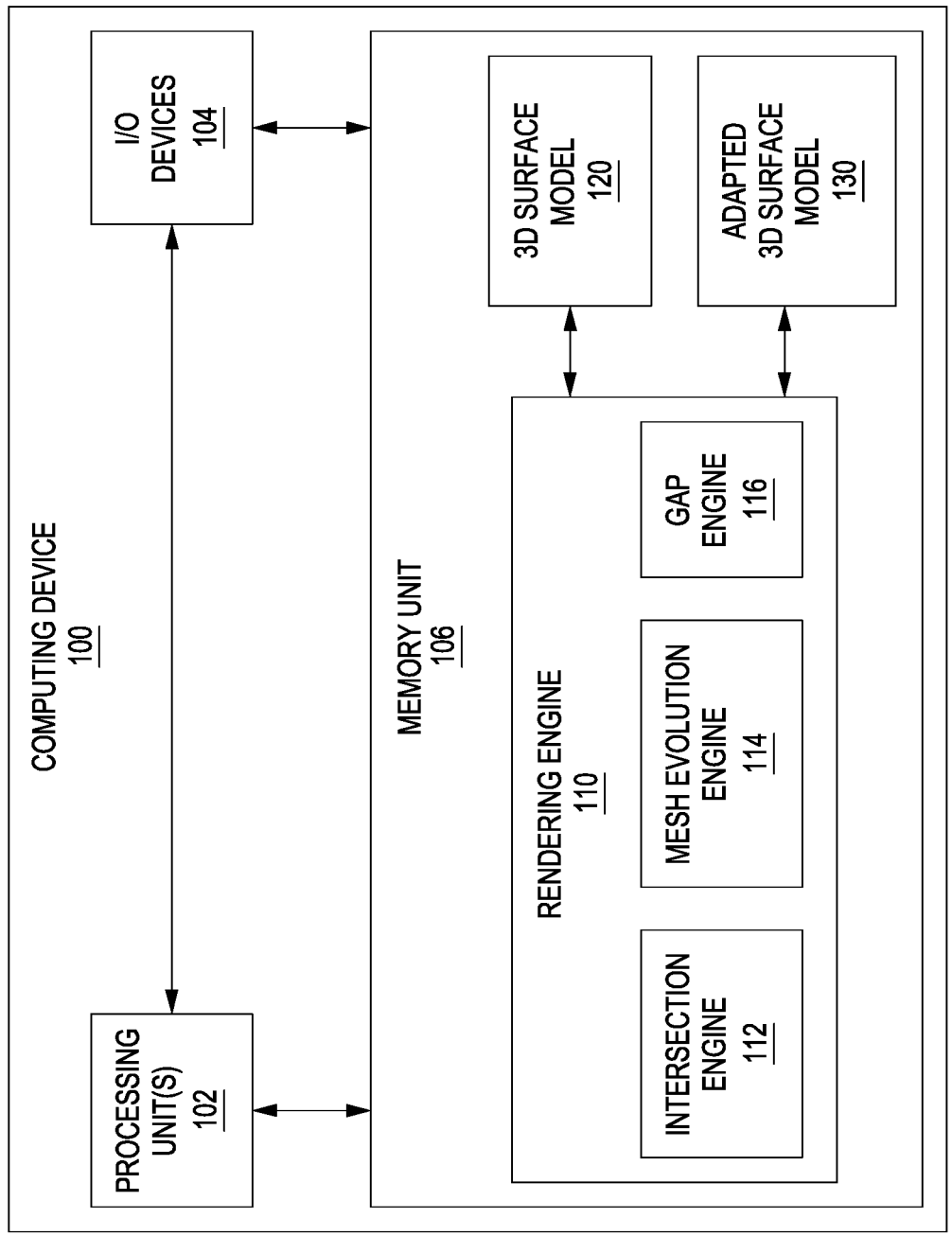
FIG. 1 is a conceptual illustration of a computing device configured to implement one or more aspects of the present invention.

FIG. 1 is a conceptual illustration of a computing device configured to implement one or more aspects of the present invention. As shown, computing device 100 includes, without limitation, one or more processing units 102 coupled to input/output (I/O) devices 104 and memory unit 106. Memory unit 106 includes rendering engine 110, 3D surface model 120, and adapted 3D surface model 130.

Processing unit 102 may be a central processing unit (CPU), a graphics processing unit (GPU), or combination of different processing units. For example, processing unit 102 can include a CPU configured to operate in conjunction with one or more GPUs. Processing unit 102 may be any technically-feasible hardware unit capable of processing data and/or executing software code.

I/O devices 104 are coupled to memory unit 106. In some embodiments, I/O devices 104 may include devices capable of receiving one or more inputs, including a keyboard, mouse, input tablet, camera, and/or three-dimensional (3D) scanner. In some embodiments, I/O devices 104 may also include devices capable of providing one or more outputs, such as a display device, speaker, and/or printer. I/O devices 104 may also include devices capable of both receiving inputs and providing outputs, such as a touchscreen and a universal serial bus (USB) port. I/O devices 104 may be configured to receive various types of inputs from a user of computing device 100. I/O devices 104 may also be configured provide various types of output to the user of computing device 100.

In some embodiments, I/O devices 104 include a 3D printer that can produce physical articles based on instructions received from memory unit 106. In some embodiments, the 3D printer can be a multi-material printer capable of manufacturing physical 3D articles that include two or more materials. In such instances, the multi-material printer may use various manufacturing technologies to create a physical article based on 3D surface model 120 or adapted 3D surface model 130. For example, the multi-material printer may use additive manufacturing techniques to create a physical article by adding successive layers of a material until a designated region of the physical article is complete.

Memory unit 106 is configured to store data and/or software applications. Memory 106 may include a random access memory (RAM) module, hard disk, flash memory unit, or any other type of memory unit or combination thereof. Processing unit 102 and I/O devices 104 are configured to read data from memory unit 106. Processing unit 102 and I/O devices 104 are also configured to write data to memory unit 106. In some embodiments, memory 106 includes a rendering engine 110, which includes an intersection engine 112, a mesh evolution engine 114, and/or a gap engine 116.

Rendering engine 110 is a software application configured to generate and/or modify 3D surface model 120 and/or adapted 3D surface model 130. For example, rendering engine 110 may comprise a computer-aided design (CAD) software tool. In some embodiments, rendering engine 110 may be a module within a CAD software application. Rendering engine 110 is also configured to render pixels or voxels that represent 3D surface model 120 and/or adapted 3D surface model 130 to an I/O device 104, such as a display device or a touchscreen. In some embodiments, rendering engine 110 may provide instructions associated with 3D surface model 120 and/or adapted 3D surface model 130 to I/O device 104, such as a 3D printer, that produces a physical article based on the instructions.

In some embodiments, rendering engine 110 may perform other operations with 3D surface model 120 and/or adapted 3D surface model 130. Such operations may include, for example, texture mapping, color mapping, mesh transformation, object alignment, and/or object scaling. In some embodiments, rendering engine 110 may receive feedback from a user specifying modifications to 3D surface model 120 and/or adapted 3D surface model 130. In such instances, rendering engine 110 may modify and re-render 3D surface model 120 and/or adapted 3D surface model 130 to reflect the specified modifications. In some embodiments, rendering engine 110 may produce adapted 3D surface model 130 based on one or more Boolean operations performed on 3D surface model 120. In such instances, rendering engine 110 may first generate an irregular surface mesh model from 3D surface model 120. In some embodiments, the irregular surface model may be a non-regularized Boolean model then generate adapted 3D surface model 130 based on the irregular model. In some embodiments, the user may specify additional modifications to the irregular model, such as removing or extracting distinct regions of the irregular model. Rendering engine 110 may modify and re-render the irregular model to reflect the specified modifications. Rendering engine 110 may then generate adapted 3D surface model 130 based on the re-rendered irregular model.

In some embodiments, rendering engine 110 uses intersection engine 112, mesh evolution engine 114, and/or gap engine 116 to approximate Boolean operations on multiple 3D objects, including 3D surface mesh 120. In such instances, rendering engine 110 may generate a non-regularized Boolean model based on the Boolean operation and produce non-manifold 3D surface model 130 as an adapted non-manifold 3D surface model based on the non-regularized Boolean model. As will be discussed in further detail below, rendering engine 110 may approximate the intersection of multiple polygonal surface meshes of the 3D objects used in the Boolean operation to provide adapted manifold surface model 130 that includes a consistent polygonal mesh throughout all of the surfaces of adapted manifold 3D surface model 130. For example, rendering engine 110 may remove and generate new triangles for one or more surface meshes when producing adapted 3D surface model 130 to ensure smooth vertices near contours of the intersection between two or more 3D objects.

Intersection engine 112 computes intersection contours between surface meshes of two or more 3D objects on which rendering engine 110 performs Boolean operations to produce adapted 3D surface model 130. In some embodiments, intersection engine 112 removes portions of surface meshes of the 3D objects that surround the intersection contours. In some embodiments, intersection engine 112 removes the portions of the surface meshes surrounding an intersection contour by removing one or more vertices and/or edges of the polygonal mesh that intersect the intersection contour. For example, intersection engine 112 can compute an intersection contour for two overlapping spheres represented with triangle closed surface meshes. Intersection engine 112 can then, for each of the surface meshes, remove vertices and/or edges of triangles that intersect the computed intersection contour. In some embodiments, intersection engine 112 may be configured to remove a specified number of vertices and/or on the surface mesh that neighbor polygons intersecting the intersection contours.

In some embodiments, intersection engine 112 determines whether the two or more surfaces meshes that intersect at the computed intersection contour align with each other. Intersection engine 112 can determine the alignment of the two or more surface meshes at the intersection contour to determine whether the surface meshes are misaligned. In some embodiments, the two or more surface meshes may align at the intersection contour when a set of vertices and edges for one surface mesh at the intersection contour match in a one-to-one relationship with a set of vertices and edges of another surface mesh at the intersection contour. The set of vertices and edges may match, for example, when each of the surface meshes share a common tessellation.

In some embodiments, intersection engine 112 determines the alignment of the two or more surface meshes before removing portions of each of the surface meshes proximate to the intersection contour. For example, intersection engine 112 can first calculate an intersection contour for two 3D objects with triangle surface meshes. Intersection engine 112 can then determine whether an edge neighboring the intersection contour has three or more neighboring triangles. In some embodiments, an intersection contour having three or more neighboring triangle may indicate that the intersection contour is non-manifold. When intersection engine 112 determines that no edges have three or more neighboring triangles, intersection engine 112 refrains from removing triangles of the two or more surface meshes that intersect the intersection contour.

Mesh evolution engine 114 evolves (i.e., grows) the boundaries of the two or more surface meshes. In some embodiments, mesh evolution engine 114 grows a boundary towards other boundaries and/or intersection contours of the non-regularized Boolean model. When intersection engine 112 removes the portions of the two or more surface meshes proximate to the intersection contours, intersection engine 112 creates one or more boundaries including a series of boundary edges on the surface meshes. Mesh evolution engine 114 grows one or more of the boundaries by generating new polygons for the polygonal mesh from the boundary edges. In some embodiments, mesh evolution engine 114 employs a technique, such as advancing-front mesh evolution, to grow a surface mesh from one or more boundary edges at a boundary. In such instances, mesh evolution engine 114 grows the surface mesh from the boundary edges towards a specified target location in relation to the non-regularized Boolean model. In some embodiments, mesh evolution engine 114 may grow the boundary edges towards every other boundary of the non-regularized Boolean model. In some embodiments, mesh evolution engine 114 may grow the boundary edges of a boundary towards the intersection contour closest to the boundary. In some embodiments, mesh evolution engine 114 may specify a target growth location based on one or more boundaries in the boundary set, as well as one or more intersection contours in an intersection contour set. In some embodiments, mesh evolution engine 112 may grow boundary edges included in each of the boundaries simultaneously or substantially in parallel. In such instances, mesh evolution engine 114 may grow the boundary edges of each of the boundaries in parallel towards a single, common intersection contour, or an intersection contour set, with each of the intersection contours included in the intersection contour set shared by two or more boundaries.

Gap engine 116 smooths one or more surface meshes of the non-regularized Boolean model to produce an adapted 3D surface model 130 having a consistent polygonal surface mesh. When intersection engine 112 removes portions of the two or more surface meshes, intersection engine 112 creates one or more gaps in the non-regularized Boolean model. Each of the created gaps is proximate to one or more boundaries of the non-regularized Boolean model. As mesh evolution engine 114 grows each of the boundaries, the gaps in the non-regularized Boolean model shrink. Gap engine 116 checks the size of each of the gaps. When the size of a target gap is within a target threshold, gap engine 116 halts the mesh evolution engine 114 from growing the one or more of the boundaries proximate to the target gap. Gap engine 116 may then implement a gap-closing algorithm to connect the one or more boundaries proximate to the gap to another portion of the non-regularized Boolean model. In some embodiments, gap engine 116 may connect two or more boundaries to each other. In some embodiments, gap engine 116 may connect a boundary to a closed portion of the non-regularized Boolean model.

In some embodiments, gap engine 116 may compare a target gap proximate to two or more boundaries to a gap threshold value. When gap engine 116 determines that size of the target gap is below the gap threshold value, gap engine 116 implements a gap-closing algorithm to close the gap. When gap engine 116 closes the target gap, gap engine 116 produces a closed portion of the non-regularized Boolean model. The closed portion of the non-regularized Boolean model maintains a consistent polygonal mesh with neighboring portions of the non-regularized Boolean model.

In some embodiments, gap engine 116 may zipper vertices of boundary edges included in two or more corresponding boundaries proximate to a target gap. When gap engine 116 implements the zippering algorithm, gap engine 116 snaps together matching vertices of a group of boundary edges on the two or more corresponding boundaries. When implementing the zippering algorithm, gap engine 116 may first use a voting technique to determine which vertices to match together. In some embodiments, gap engine 116 may determine whether a one-to-one vertex correspondence occurs between the two or more corresponding open boundaries. When gap engine 116 determines the set of vertex matches, gap engine 116 zips the boundaries together at each pair of vertices.

When gap engine 116 determines that a one-to-one vertex correspondence does not occur between the two or more corresponding boundaries, gap engine 116 may trigger intersection engine 112 to remove portions of the surface meshes at the two or more corresponding boundaries. Mesh evolution engine 114 may then regrow the two or more corresponding boundaries. Gap engine 116 may trigger a feedback loop of removing and re-growing portions of the surface meshes proximate to the two or more corresponding boundaries until a one-to-one vertex correspondence occurs between the two or more corresponding open boundaries. In some embodiments, gap engine 116 may respond to determining that a one-to-one vertex correspondence does not occur by splitting a boundary edge. In such instances, gap engine 116 may add a vertex to a boundary edge to produce two boundary edges. In some embodiments, gap engine 116 may implement one or more gap-closing algorithms pairwise on all of the boundaries until gap engine 116 determines a consistent set of vertex matches. Gap engine 116 closes each of the boundaries to produce non-manifold 3D surface model 130 as an adapted non-manifold 3D surface model.

3D surface model 120 is a mathematical model of one or more 3D shapes combined as a single object. 3D surface model 120 may include a polygonal surface mesh, a manifold, a wireframe model, a volumetric model, or a point cloud, among other types of mathematical models. In some embodiments, 3D surface model 120 includes a polygonal surface mesh that uses a plurality of triangles to form the surface mesh. In some embodiments, 3D surface model 120 may represent a physical object, such as a human or a physical article. In some embodiments, a user may generate 3D surface model 120 by scanning a physical person or object and save the data via I/O devices 104 in memory unit 106. In some embodiments, 3D surface model 120 may represent a virtual object, such as a character or shape created by a user using a software application.

Adapted 3D surface model 130 is a mathematical model of one or more 3D shapes. 3D surface model 120 may form a manifold, which envelopes a volume and has a closed surface mesh. Rendering engine 110 may generate a non-regularized Boolean when joining two or more 3D surface models 120. The non-regularized Boolean model is non-manifold and includes surfaces or sheets inside a volume. In some embodiments, rendering engine 110 may produce adapted manifold 3D surface model 130 based on 3D surface model 120. In some embodiments, rendering engine 110 may perform Boolean operations on 3D surface model 120 and other 3D objects, such as shapes with closed surface meshes, to produce the non-regularized Boolean model. In such instances, rendering engine 110 may produce adapted manifold 3D surface model 130 based on the non-regularized Boolean model.

For example, 3D surface model 120 may be a sphere represented by a triangle closed surface mesh. Rendering engine 110 may perform a union Boolean operation on 3D surface model 120 and a tetrahedron shape with a closed surface mesh to form a non-regularized Boolean model. In such instances, the non-regularized Boolean model may be a non-manifold surface model that includes one or more internal sheets represented by interior surface mesh portions. In some embodiments, rendering engine 110 may use one or more of intersection engine 112, mesh evolution engine 114, and/or gap engine 116 to join the surface meshes of 3D surface model 120 and the tetrahedron to produce the non-regularized Boolean model. In such instances, adapted 3D surface model 130 may be an adapted non-manifold 3D surface mesh generated from a Boolean operation, otherwise known as a non-regularized Boolean surface mesh.

As will be discussed in further detail below, in some embodiments, the one or more interior surface mesh portions of adapted 3D surface model 130 may separate adapted 3D surface model 130 into two or more distinct surface regions. In some embodiments, the two or more distinct surface regions may include at least one interior region and at least one exterior region. In some embodiments, a user may assign characteristics to each distinct surface region independent of the other surface regions. For example, a user may assign an interior region with a first material characteristic (e.g., a metal), while assigning an exterior region with a second material characteristic (e.g., a plastic). A multi-material 3D printer may receive adapted 3D surface model 130 and print a physical article with different materials based on the different surface regions.

Figure 2:
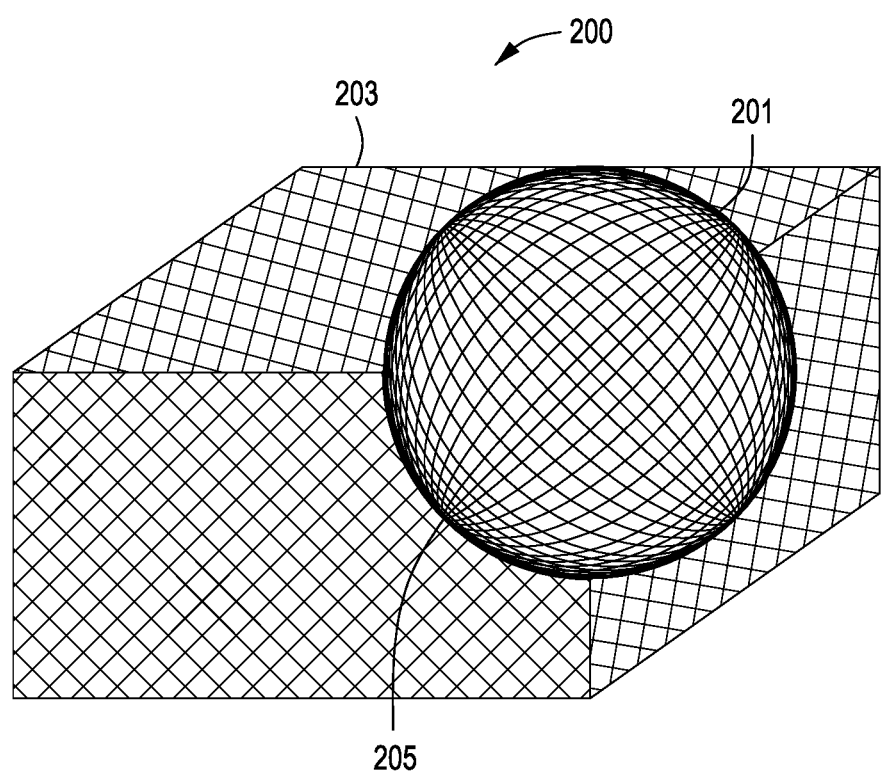
FIG. 2 is a conceptual illustration of an irregular surface mesh model formed from a conventional Boolean combination of a sphere and a rectangular cuboid.

FIG. 2 is a conceptual illustration of an irregular surface mesh model formed from a conventional Boolean combination of a sphere and a rectangular cuboid. Irregular surface mesh model 200 includes 3D objects 201, 203 and intersection contour 205. Rendering engine 110, as shown in FIG. 1, is configured to perform Boolean operations on 3D objects 201, 203 by generating Irregular surface mesh model 200 based on joining 3D objects 201, 203. In some embodiments, rendering engine 110 may generate irregular surface mesh model 200 as a non-regularized Boolean model. In some embodiments, rendering engine 110 may generate irregular surface mesh model 200 as an intermediate 3D surface model and generate a new shape as a 3D surface mesh 120 or adapted manifold surface model 130 by performing Boolean operations on one or more surface regions included in irregular surface mesh model 200.

Non-regularized Boolean model is produced by rendering engine 110 when rendering engine 110 joins two or more 3D objects 201, 203. Because 3D objects 201 and 203 overlap, irregular surface mesh model 200 includes an interior surface region volume defined by one or more interior surface mesh portions. In some embodiments, rendering engine 110 may attempt to join 3D objects 201, 203 to form irregular surface mesh model 200 by computing one or more exact intersection contours 205. If intersection engine 112 of rendering engine 110 can exactly compute the one or more intersection contours 205, intersection engine 112 may combine vertices of 3D objects 201, 203 proximate to intersection contour 205 to create irregular surface mesh model 200. In some embodiments, if intersection engine 112 determines that intersection contour 205 cannot be computed exactly, rendering engine 110 may implement intersection engine 112, mesh evolution engine 114, and/or gap engine 116 to produce irregular surface mesh model 200 by removing portions of the surface meshes of 3D objects 201, 203 proximate to intersection contour 205 and re-growing the portions proximate to intersection contour 205 to produce adapted 3D surface model 130 that includes a consistent polygonal surface mesh. In some embodiments, the polygonal surface mesh is consistent between exterior portions of the surface mesh and interior portions of the surface mesh.

3D objects 201, 203 are objects that each have by a polygonal surface mesh. For example, 3D object 201 is a sphere with a triangular closed surface mesh. In some embodiments, 3D objects 201, 203 have surfaces that are closed and manifold. In the illustrative example, 3D object 203 is a rectangular cuboid with a triangular closed surface mesh. In some embodiments, 3D objects 201, 203 may share a common tessellation. In some embodiments, 3D objects 201, 203 have intersection contour 205 where the surface meshes align exactly. In such instances, vertices of 3D object 201 match exactly in a one-to-one correspondence with vertices of 3D object 203 at intersection contour 205. When the surface meshes of 3D objects 201, 203 align exactly at intersection contour 205, rendering engine 110 may join 3D objects 201, 203 at intersection contour 205 by connecting the matching vertices. In such instances, rendering engine 110 may not implement intersection engine 112 to remove portions of the surface meshes of 3D objects 201, 203 proximate to intersection contour 205.

In some embodiments, 3D objects 201, 203 may not share a common tessellation. In some embodiments, the surface meshes of 3D objects 201, 203 may not align exactly when joined. In such instances, rendering engine 110 may implement intersection engine 112 to calculate intersection contour 205 as an approximation of a set of vertices and edges where the surface meshes of 3D objects 201, 203 intersect. Rendering engine 110 may implement intersection engine 112, mesh evolution engine 114, and/or gap engine 116 to remove portions of the surface meshes of 3D objects 201, 203 and re-grow the portions of the surface meshes of irregular surface mesh model 200 such that irregular surface mesh model 200 maintains a consistent polygonal surface mesh proximate to intersection contour 205. As will be discussed in further detail below, rendering engine 110 may produce adapted 3D surface model 130 from irregular surface mesh model 200, where adapted 3D surface model 130 maintains a consistent surface mesh for the internal surface meshes within adapted 3D surface model 130.

Intersection contour 205 is a set of points common to both 3D objects 201, 203. Intersection contour 205 is formed when rendering engine 110 joins 3D objects 201, 203. In some embodiments, intersection engine 112 may compute an intersection contour set that includes multiple intersection contours 205 generated from rendering engine 110 joining 3D objects 201, 203. In such instances, intersection engine 112 may produce pairs of corresponding boundaries proximate to intersection contour 205. In some embodiments, intersection engine 112 may produce a set of three or more corresponding boundaries proximate to an intersection contour 205. Mesh evolution engine 114 may grow the corresponding boundaries towards each other. In some embodiments, mesh evolution engine 113 may grow the corresponding boundaries towards the common intersection contour 205 proximate to the corresponding boundaries. In some embodiments, intersection contour 205 may be self-intersecting. When intersection engine 112 computes a self-intersecting intersection contour 205, intersection engine 112 may split the self-intersecting intersection contour 205 into multiple non-intersecting intersection contours 205.

Figure 3A:
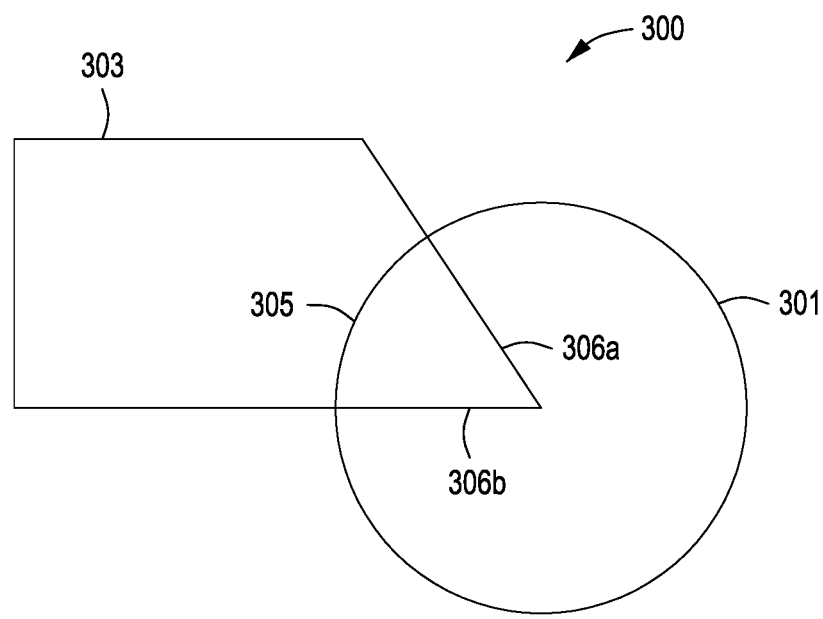
FIG. 3A is a conceptual illustration of a slice of a non-regularized Boolean mesh formed from a Boolean combination of a sphere and an irregular polyhedron, according to various embodiments of the present invention.

FIG. 3A is a conceptual illustration of a slice of a non-regularized Boolean mesh formed from a Boolean combination of a sphere and an irregular polyhedron, according to various embodiments of the present invention. The cross-section of non-regularized Boolean mesh 300 includes sphere 301 and irregular polyhedron 303. Non-regularized Boolean mesh 300 includes an intersection contour 305 where the surface mesh of sphere 301 intersects with the surface mesh of irregular polyhedron 303. Sphere 301 and irregular polyhedron 303 have a plurality of interior surface mesh portions 306a-b within the volume of non-regularized Boolean mesh 300.

Non-regularized Boolean mesh 300 is produced by rendering engine 110 joining sphere 301 having a closed surface mesh and irregular polyhedron 303 having a separate closed surface mesh. When rendering engine 110 performs a Boolean operation to join sphere 301 and irregular polyhedron 303, rendering engine 110 generates non-regularized Boolean mesh 300. Non-regularized Boolean mesh 300 includes one or more interior surface mesh portions 306a-b. The surface meshes of sphere 301 and irregular polyhedron form one or more intersection contours 305.

In some embodiments, rendering engine 110 may not compute intersection contour 305 exactly. This may occur, for example, when vertices on the surface mesh of sphere 301 do not align with vertices on the surface mesh of irregular polyhedron 303. When rendering engine 110 does not compute intersection contour 305 exactly, portions of the surface mesh of sphere 301 proximate to intersection contour 305 may overlap with portions of the surface mesh of irregular polygon 303. In other embodiments, portions of the surface mesh of sphere 301 proximate to intersection contour 305 may not reach portions of the surface mesh of irregular polygon 303. When this occurs, non-regularized Boolean mesh 300 may have an air gap between the portions of the respective surface meshes 301, 303. When non-regularized Boolean mesh 300 includes overlapping regions and/or air gaps, non-regularized Boolean mesh 300 may not include distinct interior and/or exterior surface regions because the surface meshes of non-regularized Boolean mesh 300 do not completely define distinct surface regions within the volume of non-regularized Boolean mesh 300.

Intersection contour 305 is a line where a portion of the surface mesh of sphere 301 intersects with a portion of the surface mesh of irregular polyhedron 303. While the slice of non-regularized Boolean mesh 300 illustrates a portion of intersection contour 305 as a line, intersection contour 305 extends to other faces of sphere 301 and irregular polyhedron 303 to form a closed curve. In some embodiments, non-regularized Boolean mesh 300 may include a plurality of intersection contours 305. In some embodiments, intersection contour 305 crosses an intersecting set of vertices, edges, and/or faces of the surface meshes of sphere 301 and/or irregular polyhedron 303. As will be discussed in further detail below, intersection engine 112 computes intersection contour 305 and determines the intersecting set of vertices, edges, and/or faces of the surface meshes of sphere 301 and/or irregular polyhedron 303 that cross or neighbor intersection contour 305.

Interior surface mesh portions 306a-b are portions of the surface mesh of sphere 301 and/or irregular polyhedron 303 that are within the volume of non-regularized Boolean mesh 300. In some embodiments, portions of intersection contour 305 are included in a set of interior surface mesh portions 306a-b. In some embodiments, a set of interior surface mesh portions 306a-b also include portions of the surface meshes 301, 303 that are interior to the volume of non-regularized Boolean mesh 300, but do not overlap other surface mesh portions of sphere 301 and/or irregular polyhedron 303.

Figure 3B:
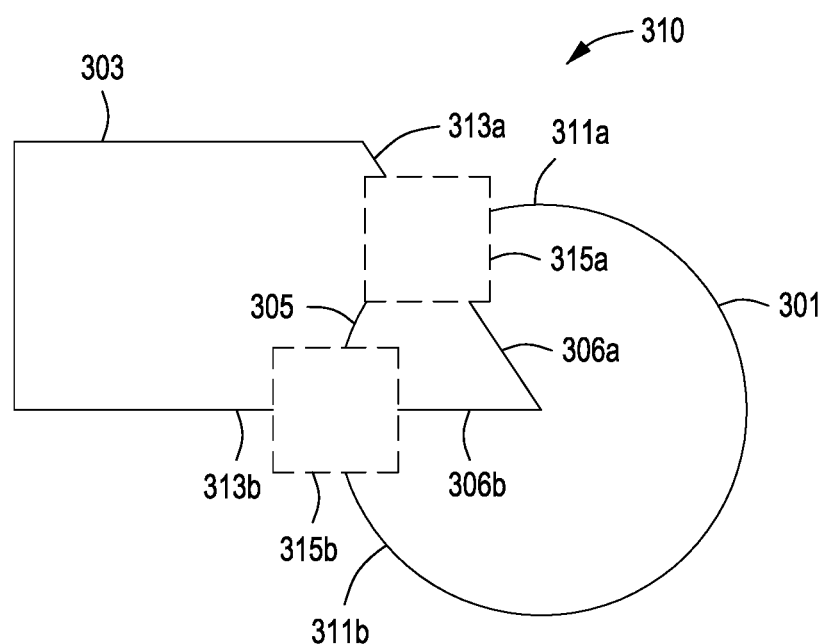
FIG. 3B is a conceptual illustration of a slice of a non-regularized Boolean mesh with intersection contour areas removed, according to various embodiments of the present invention.

FIG. 3B is a conceptual illustration of a slice of a non-regularized Boolean mesh with intersection contour areas removed, according to various embodiments of the present invention. Non-regularized Boolean mesh 310 includes sphere 301 and irregular polyhedron 303. Intersection engine 112 computes intersection contour 305 and removes intersection portions 315a-b proximate to portions of intersection contour 305. Removal of intersection portions 315a-b by intersection engine 112 forms a boundary set 311a-b, 313a-b proximate to intersection contour 305 and intersection portions 315a-b. Removal of intersection portions 315a-b also forms boundary gaps at the intersection portions 315a-b.

In some embodiments, intersection engine 112 determines intersection contour 305 by determining an intersecting set of vertices, edges, and/or faces of the surface meshes of sphere 301 or irregular polyhedron 303 that intersect with vertices, edge, and/or face of the other surface mesh. In some embodiments, intersection engine 112 determines whether a vertex, edge, and/or face is common to the surface mesh of sphere 301 and the surface mesh of irregular polyhedron 303.

In some embodiment, intersection engine 112 may remove a portion of surface meshes of sphere 301 and/or irregular polyhedron 303 that are proximate to intersection contour 305. In some embodiments, intersection engine 112 removes intersection contour 305 completely. In some embodiments, intersection engine 112 only removes portions of intersection contour 305. For example, intersection engine 112 may only remove portions of intersection contour on the exterior of non-regularized Boolean mesh 310. In some embodiments, intersection engine 112 removes intersection contour 305 by removing one or more vertices, edges, and/or faces included in the computed intersecting set. In some embodiments, intersection engine 112 may also remove one or more vertices, edges, and/or faces that neighbor at least one of the vertices, edges, and/or faces included in the intersecting set.

For example, intersection engine 112 can compute intersection contour 305 and a corresponding intersecting set of vertices and edges. Intersection engine 112 can then remove intersection portions 315a-b proximate to intersection contour 305. The removed intersection portions 315a-b can include an intersecting subset of vertices and edges included in the intersecting set. The removed intersection portions 315a-b can also include a set of vertices and edges neighboring the intersecting subset of vertices and edges. The removed intersection portions 315a-b produce boundary gaps in non-regularized Boolean mesh 310 proximate to intersection contour 305.

Boundaries 311a-b, 313a-b are formed when intersection engine 112 removes intersection portions 315a-b from non-regularized Boolean mesh 310. In some embodiments, the remaining portions of intersection contour 305 and interior mesh portions 306a-b are included in the boundary set. Intersection engine 112 produces boundaries 311a-b on the surface mesh of sphere 301. Intersection engine 112 also produces boundaries 313a-b on the surface mesh of irregular polyhedron 303. Two or more boundaries are proximate to a boundary gap formed by removing intersection portions 315a-b. For example, the boundary gap at removed intersection portion 315 includes boundaries 305, 306a, 311a, 313a. As will be discussed in further detail below, as mesh evolution engine 114 grows the boundaries, the boundary gap between corresponding boundaries constricts, and gap engine 116 closes the boundary gap when the gap size falls below a gap threshold value.

Figure 3C:
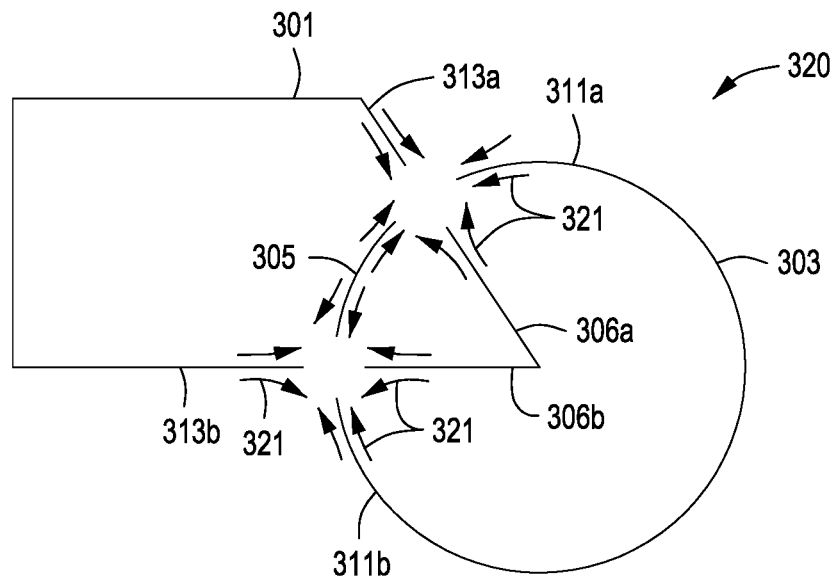
FIG. 3C is a conceptual illustration of a slice of a non-regularized Boolean mesh with boundaries extending through mesh evolution, according to various embodiments of the present invention.

FIG. 3C is a conceptual illustration of a slice of a non-regularized Boolean mesh with boundaries extending through mesh evolution, according to various embodiments of the present invention. Non-regularized Boolean mesh 320 includes a boundary set. The boundary set includes boundaries 311a-b, 313a-b of the surface meshes of sphere 301 and irregular polyhedron 303, as well as portions of intersection contour 305 and interior surface mesh portions 306a-b. Mesh evolution engine 114 evolves one or more of the boundaries in the boundary set towards at least one of the other boundaries included in the boundary set.

Mesh evolution engine 112 grows at least one boundary in the boundary set by implementing an evolution algorithm to provide new vertices and/or edges to boundary edges of the boundary of a surface mesh based on the tessellation of the boundary edges of the surface mesh. In some embodiments, mesh evolution engine 112 implements an advancing-front style mesh evolution to grow the surface mesh from the boundary edges of a boundary towards an intended target location on or proximate to non-regularized Boolean mesh 320. In some embodiments, the intended target location is based on at least one other boundary in the boundary set and/or one or more intersection contours 305.

In some embodiments, mesh evolution engine 114 and/or intersection engine 112 computes a target intersection contour based on two or more boundaries included in the boundary set. In some embodiments, mesh evolution engine 114 and/or intersection engine 112 computes a target intersection contour based on one or more intersection contours 305. Mesh evolution engine 114 may grow one or more of the boundaries in the open boundary set towards the target intersection contour.

In some embodiments, mesh evolution engine 114 grows two or more of the boundaries in the boundary set simultaneously or substantially in parallel. For example, mesh evolution engine 114 may implement two or more evolving algorithms for different boundaries in the boundary set in parallel, with each evolving algorithm adding vertices, edges, and/or faces to a separate boundary in the boundary set. In some embodiments, mesh evolution engine 114 grows each boundary in the boundary set substantially in parallel or simultaneously.

For example, mesh evolution engine 114 may grow one or more boundaries in the boundary set, including the portion of intersection contour 305, interior surface mesh portions 306a-b, and/or boundaries 311a-b, 313a-b. Mesh evolution engine 114 may grow each of the boundaries in a growing direction 321 towards an intended target location. In some embodiments, mesh evolution engine 114 may determine growing direction 321 based on at least one other boundary in the boundary set. In some embodiments, mesh evolution engine 114 may determine growing direction 321 for each boundary in the boundary set independently.

As mesh evolution engine 116 grows one or more boundaries in the boundary set, the boundary gaps between the boundaries in the boundary set constrict. Gap engine 116 calculates the size of a target gap between two or more boundaries in the boundary set. Gap engine 116 compares the calculated target gap size to a predefined gap threshold value. When gap engine 116 determines that the calculated target gap size is below the gap threshold value, gap engine 116 implements a gap-closing algorithm to connect the two or more boundaries proximate to the target gap. In some embodiments, gap engine 116 may compare the target gap size to the gap threshold value while mesh evolution engine 114 is growing corresponding boundaries proximate to the target gap. When gap engine 116 determines that the target gap size is below the target threshold, gap engine 114 may halt the mesh evolution engine 114 from implementing an evolution algorithm on the corresponding boundaries proximate to the target gap. Gap engine 114 may then implement a gap-closing algorithm on the corresponding open boundaries proximate to the target gap.

In some embodiments, gap engine 116 implements a gap-closing algorithm that matches vertices of the surface mesh of one of the boundaries proximate to the target gap with vertices of the surface mesh of another boundary proximate to the target gap. The gap-closing algorithm ensures that there is a one-to-one correspondence between vertices of the corresponding boundaries proximate to the target gap. Gap engine 116 may implement a zippering algorithm to combine the matching sets of vertices. In some embodiments, gap engine 116 may not ensure a one-to-one correspondence between vertices of corresponding open boundaries. In some embodiments, gap engine 116 may respond by splitting a boundary edge. In such instances, gap engine 116 may add a vertex to a boundary edge to produce two boundary edges. In some embodiments, gap engine 116 may respond to determining a one-to-one vertex correspondence by triggering intersection engine 112 to remove one or more vertices from the corresponding boundaries and trigger mesh evolution engine 114 to regrow the boundaries. Gap engine 116 may trigger a feedback loop of removing and re-growing portions of the corresponding boundaries until gap engine 116 can determine a one-to-one correspondence between vertices.

Figure 3D:
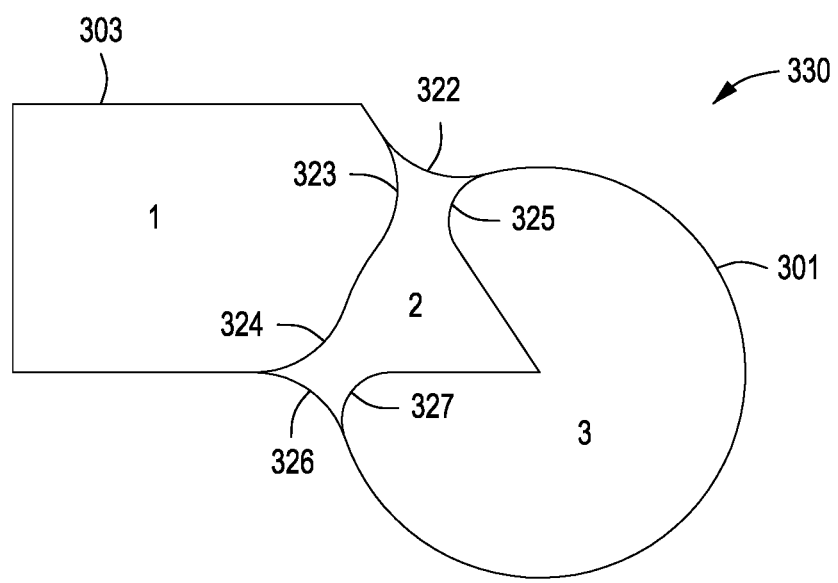
FIG. 3D is a conceptual illustration of a slice of an adapted non-manifold mesh, according to various embodiments of the present invention.

FIG. 3D is a conceptual illustration of a slice of an adapted non-manifold mesh, according to various embodiments of the present invention. Adapted non-manifold 3D surface mesh 330 is a 3D surface model based on a Boolean combination of sphere 301 and irregular polyhedron 303 that includes a consistent polyhedral surface mesh. Gap engine 116 connects boundaries in the boundary set to produce closed portions 322-327 of adapted non-manifold 3D surface mesh 330. Closed portions 322-327 and other portions of the surface meshes of adapted non-manifold surface mesh 330 define distinct regions within adapted non-manifold 3D surface mesh 330, denoted by "1", "2," and "3."

Adapted non-manifold 3D surface mesh 330 includes closed portions 322-327 that are formed by mesh evolution engine 114 growing the boundaries included in the boundary set and gap engine 116 combining corresponding vertices of the sets of boundaries. Gap engine 116 produces closed portions 322-327 by implementing a zippering algorithm on a matching set of vertices between two or more corresponding boundaries. In some embodiments, gap engine 116 may combine three or more boundaries in the boundary set to form one or more closed portions 322-327.

Closed portions 322-327 are properly aligned with other portions of adapted non-manifold 3D surface mesh 330. Closed portions 322-327 combine with other portions of adapted non-manifold 3D surface mesh 330 to provide distinct surface regions within adapted non-manifold 3D surface mesh 330. The distinct surface regions include two exterior regions, denoted by "1" and "3," as well as an interior region, denoted by "2." As will be discussed in further detail below, rendering engine 110 can perform Boolean operations on one or more of the distinct surface regions to provide new shapes based on adapted non-manifold 3D surface mesh 330.

Figure 4A:
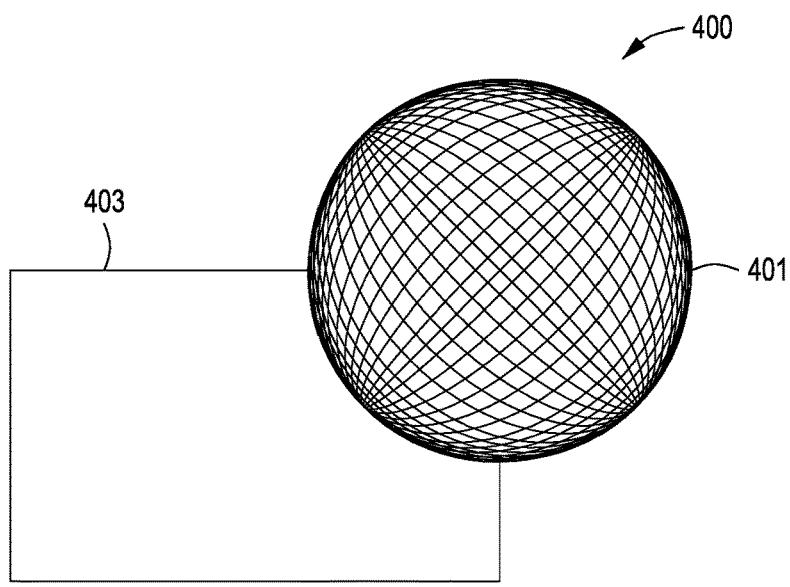
FIG. 4A is a conceptual illustration of a slice of a non-regularized Boolean mesh formed from a Boolean combination of a sphere and a rectangular cuboid, according to various embodiments of the present invention.

FIG. 4A is a conceptual illustration of a slice of a non-regularized Boolean mesh formed from a Boolean combination of a sphere and a rectangular cuboid, according to various embodiments of the present invention. Non-manifold 3D surface mesh 400 is similar to irregular surface mesh model 200 and is formed when rendering engine 110 joins the closed surface mesh of sphere 401 with the closed surface mesh of rectangular cuboid 403. In some embodiments, rendering engine 110 may not align the closed surface meshes exactly. Rendering engine 110 may produce an adapted non-manifold 3D surface mesh 330 to that includes a consistent surface mesh.

Figure 4B:
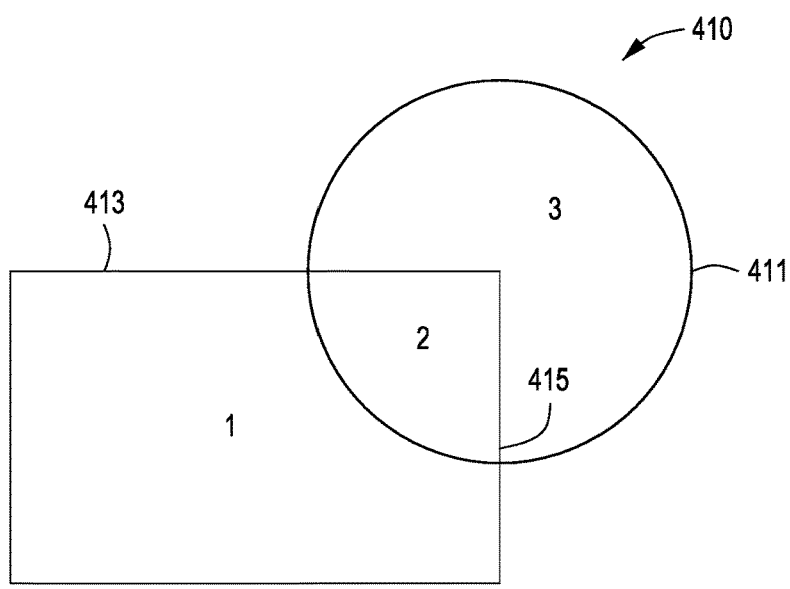
FIG. 4B is a conceptual illustration of a slice of regions within an adapted non-manifold mesh, according to various embodiments of the present invention.

FIG. 4B is a conceptual illustration of a slice of regions within an adapted non-manifold mesh, according to various embodiments of the present invention. Adapted non-manifold 3D surface mesh 410 is similar to adapted non-manifold 3D surface mesh 330. Adapted non-manifold 3D surface mesh 410 includes three distinct surface regions defined by portions of the surface mesh, including interior surface mesh portions 306a-b. The distinct regions include exterior regions 411, 413, denoted by "1" and "3," respectively. The distinct regions also include interior region 415, denoted by "2."

The distinct surface regions are defined by portions of the surface mesh on the exterior and interior of adapted non-manifold 3D surface mesh 410. Rendering engine 110 may produce adapted non-manifold 3D surface mesh to ensure that the interior and exterior portions of the surface mesh are consistent such that the interior and exterior portions define the surface regions without overlapping vertices or air gaps between portions of the surface mesh. In some embodiments, rendering engine 110 may assign characteristics to one of the surface regions independent of characteristics assigned to the other surface regions.

Figure 4C:
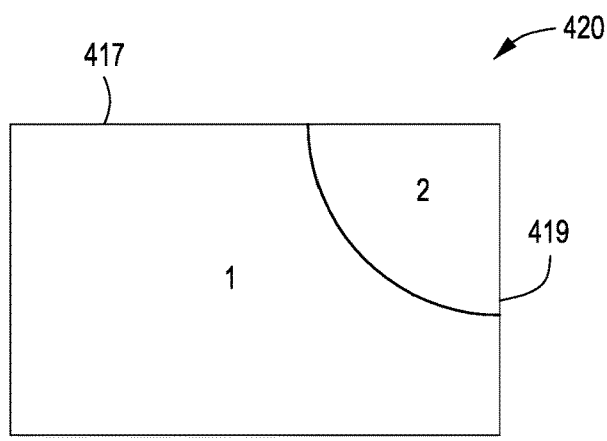
FIG. 4C is a conceptual illustration of a slice of an adapted non-manifold mesh with a region removed, according to various embodiments of the present invention.

FIG. 4C is a conceptual illustration of a slice of an adapted non-manifold mesh with a region removed, according to various embodiments of the present invention. Edited non-manifold 3D surface mesh 420 is based on adapted non-manifold surface mesh 410. Edited non-manifold 3D surface mesh 420 includes first region 417, denoted by "1", as well as second region 419, denoted by "2."

In some embodiments, rendering engine 110 may receive an indication to perform a Boolean operation on adapted non-manifold 3D surface mesh 410. For example, rendering engine 110 may receive an indication from the user to remove exterior region 411 from adapted non-manifold 3D surface mesh 410. Rendering engine 110 responds to the indication by performing a Boolean operation to only remove exterior region 411. After performing the Boolean operation, rendering engine 110 produces edited non-manifold 3D surface mesh 420 as a rectangular cuboid that includes two distinct surface regions defined by an interior surface mesh portion.

Figure 5:
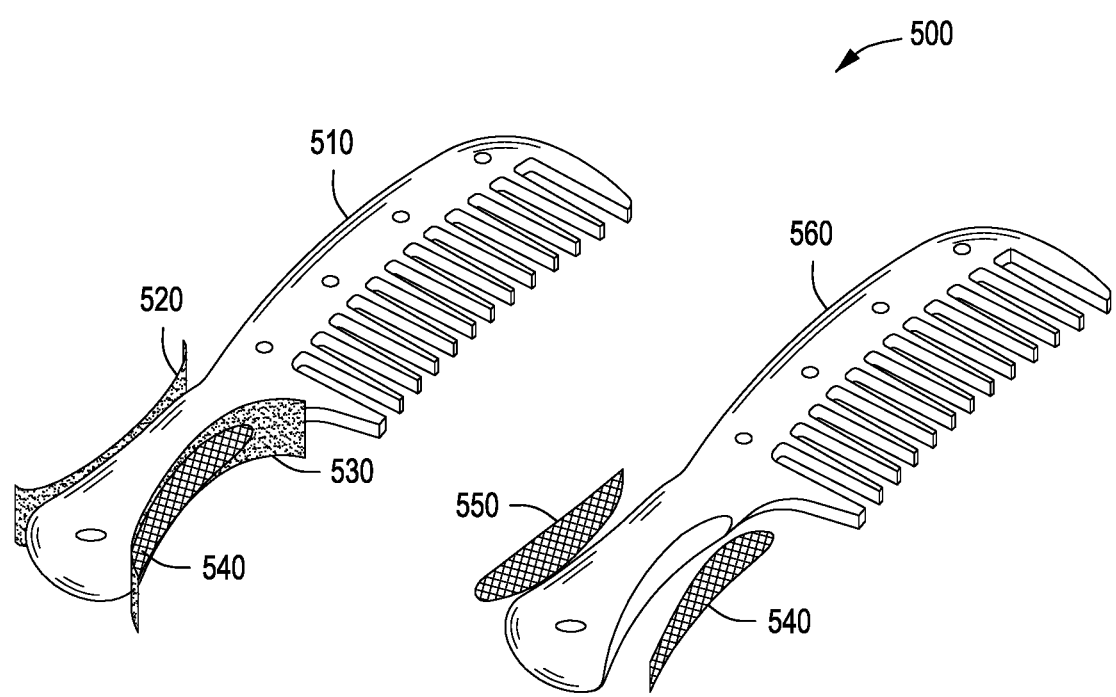
FIG. 5 is a conceptual illustration of regions formed on a 3D surface model using Boolean operations, according to various embodiments of the present invention.

FIG. 5 is a conceptual illustration of regions formed on a 3D surface model using Boolean operations, according to various embodiments of the present invention. Non-manifold 3D surface model 500 includes a 3D object 510, portions of polygonal 3D surface meshes 520, 530, and interior regions 540, 550.

3D object 510 is a 3D surface model of a physical hair comb. In operation, rendering engine 110 modifies 3D object 510 by joining 3D object 510 with two polygonal 3D surface meshes 520, 530. FIG. 5 only illustrates a portion of polygonal 3D surface meshes 520, 530 that intersect with 3D object 510. In some embodiments, rendering engine 110 uses intersection engine 112, mesh evolution engine 114, and/or gap engine 116 to generate a non-regularized Boolean model from 3D object 510 and surface meshes 520, 530 and produce an adapted non-manifold 3D surface mesh from the non-regularized Boolean model. The adapted non-manifold 3D surface mesh includes two interior surface regions 540, 550 defined by the illustrated interior surface mesh portions of surface meshes 520, 530 that overlap with the volume of 3D object 510.

In some embodiments, after generating the adapted non-manifold 3D surface model, rendering engine 110 may receive an indication to remove one or more distinct surface regions of the adapted non-manifold 3D surface model. For example, rendering engine 110 may receive an indication to remove exterior surface regions of the adapted non-manifold 3D surface model defined by surface meshes 520, 530 that do not overlap with the volume of 3D object 510 (not shown). Rendering engine 110 may perform a Boolean operation to remove the indicated exterior surface regions to produce an edited non-manifold 3D surface mesh that includes three distinct surface regions 540, 550, 560.

In some embodiments, a user may assign different characteristics to each of the distinct surface regions 540, 550, 560. For example, a user may assign a different material to each distinct surface region 540, 550, 560. Similarly, a user may assign a different color to each distinct surface region 540, 550, 560. Rendering engine 110 may associate each of the distinct regions with the characteristics assigned by a user. Rendering engine 110 may then provide I/O device 107 with the edited non-manifold 3D surface model with the associated characteristics for each region. When rendering engine 110 sends the edited non-manifold 3D surface model to I/O device 107, such as a 3D printer, the 3D printer prints each distinct region with the characteristics of the region. The characteristics can include, for example, printing material and/or printing color.

Figure 6:
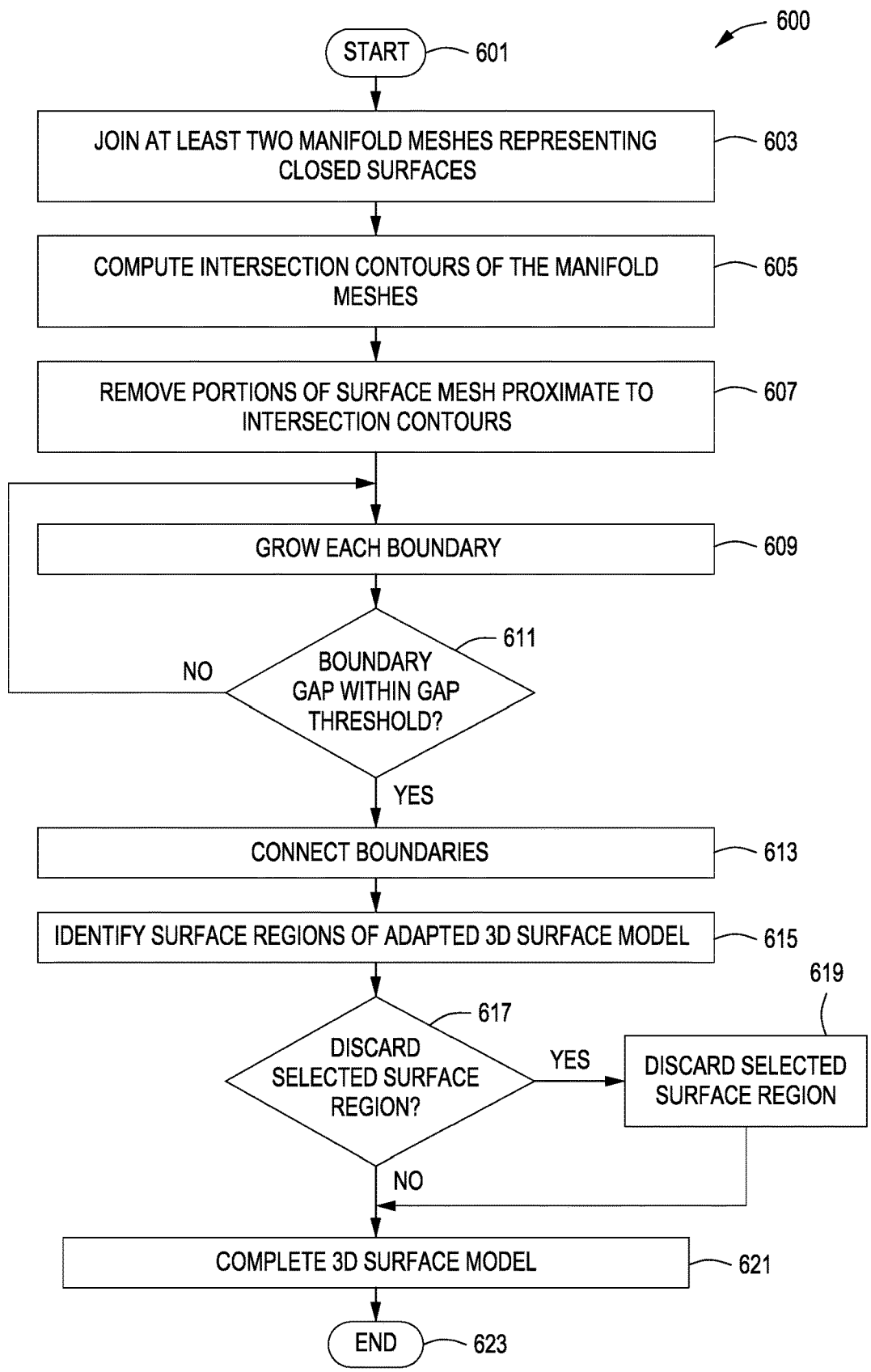
FIG. 6 is a flow diagram of method steps for rendering an adapted non-manifold mesh, according to various embodiments of the present invention.

FIG. 6 is a flow diagram of method steps for rendering an adapted non-manifold mesh, according to various embodiments of the present invention. Although the method steps described in conjunction with the systems of FIGS. 1-5, persons skilled in the art will understand that any system configured to perform the method steps, in any order, is within the scope of the invention.

Method 600 starts at step 601. At step 603, rendering engine 110 joins at least two 3D objects that have manifold surface meshes representing closed surfaces. In some embodiments, rendering engine performs a Boolean operation on two or more manifold surface meshes to form a non-regularized Boolean model having a non-manifold surface mesh. The non-manifold 3D surface mesh includes at least one portion of the surface mesh in the interior volume of the non-manifold 3D surface model.

At step 605, rendering engine 110 computes an intersection contour of the manifold surface meshes. In some embodiments, rendering engine 110 may implement intersection engine 112 to compute one or more intersection contours between the closed surface meshes being joined. In some embodiments, intersection engine 112 computes an intersection contour and determines an intersecting set of vertices, edges, and/or faces of the surface meshes that cross or neighbor the intersection contour.

At step 607, rendering engine 110 removes portions of the surface mesh proximate to the intersection contours. In some embodiments, rendering engine 110 may implement intersection engine 112 to remove portions of the surface meshes that are proximate the intersection contours. In some embodiments, intersection engine 112 removes an intersection contour by removing one or more vertices, edges, and/or faces included in the intersecting set. In some embodiments, intersection engine 112 may also remove one or more vertices, edges, and/or faces that neighbor at least one of the vertices, edges, and/or faces included in the intersecting set. The removal of the portions of the surface meshes by intersection engine 112 creates a boundary set and a set of boundary gaps.

At step 609, rendering engine 110 grows each boundary. In some embodiments, rendering engine 110 may implement mesh evolution engine 114 to grow each boundary towards other boundaries and the locations of the intersection contours. In some embodiments, mesh evolution engine 112 grows at least one boundary by implementing an evolution algorithm to provide new vertices and/or edges to the boundary of a surface mesh based on the tessellation of the boundary edges of the surface mesh proximate to the boundary. In some embodiments, mesh evolution engine 114 grows two or more of the boundaries in the boundary set simultaneously or substantially in parallel. For example, mesh evolution engine 114 may implement two or more evolving algorithms for different boundaries in the boundary set in parallel, with each evolving algorithm adding vertices, edges, and/or faces to a separate boundary in the boundary set. In some embodiments, mesh evolution engine 114 grows each boundary in the boundary set substantially in parallel or simultaneously.

At step 611, rendering engine 110 determines whether a boundary gap is within a gap threshold. In some embodiments, rendering engine 110 implements gap engine 116 to calculate the size of a boundary gap between two or more boundaries in the open boundary set. Gap engine 116 compares the calculated target gap size of the boundary gap to a predefined gap threshold value. When gap engine 116 determines that the calculated gap size is below the gap threshold value, rendering engine 110 proceeds to step 613. Otherwise, when the calculated gap size is not within the gap threshold value, rendering engine 110 returns to step 609 to grow the open boundaries.

At step 613, rendering engine 110 connects the boundaries of the non-manifold 3D surface mesh. In some embodiment, rendering engine 110 implements gap engine 116 to connect boundaries to one or more other portions of the surface mesh. Gap engine 116 connects the boundaries to the one or more other portions of the surface mesh such that the surface mesh maintains a consistent polygonal mesh throughout the non-manifold surface mesh. In some embodiments, gap engine 116 implements a gap-closing algorithm that adds and/or matches vertices of the surface mesh of one of the boundaries proximate to the boundary gap with vertices of the surface mesh of another open boundary proximate to the boundary gap. The gap-closing algorithm ensures that there is a one-to-one correspondence between vertices of the corresponding open boundaries proximate to the boundary gap. Gap engine 116 may implement a zippering algorithm to combine the matching sets of vertices. The connection of boundaries by rendering engine 110 causes rendering engine 110 to produce adapted 3D surface model 130 based on the non-regularized Boolean model. In some embodiments, the adapted 3D surface model is non-manifold.

At step 615, rendering engine 110 identifies surface regions of adapted 3D surface model 130. In some embodiments, the surface mesh of adapted 3D surface 130 model is non-manifold, including at least two distinct surface regions. The at least two distinct surface regions include an interior region and an exterior region. The distinct surface regions are defined by portions of the surface mesh on the exterior and interior of adapted 3D surface 130. When producing the adapted 3D surface model 130, rendering engine 110 may ensure that the interior and exterior portions of the surface mesh are consistent such that the interior and exterior portions define distinct surface regions without overlapping vertices or air gaps between portions of the surface mesh. In some embodiments, a user can assign different characteristics to each of the distinct regions included in adapted 3D surface model 130.

At step 617, rendering engine 110 determines whether an indication from a user to discard a distinct surface region was received. For example, rendering engine 110 may receive an indication from the user to remove exterior region 411 from adapted non-manifold 3D surface mesh 410. If rendering engine 110 determines that the indication from a user to discard a distinct surface region was received, rendering engine 110 proceeds to step 619. Otherwise, if rendering engine 110 determines that the indication from a user to discard a distinct surface region was not received, rendering engine proceeds to step 621.

At step 619, rendering engine 110 discards the selected distinct surface region. In some embodiments, rendering engine 110 may respond to the indication received in step 617 by performing a Boolean operation to only remove the selected region from the adapted non-manifold 3D surface mesh. After performing the Boolean operation, rendering engine 110 produces an edited non-manifold 3D surface mesh 420 from the adapted non-manifold 3D surface mesh 410.

At step 621, rendering engine 110 completes the 3D surface model. In some embodiments, rendering engine finalizes the adapted non-manifold 3D surface mesh 410 or edited non-manifold 3D surface mesh 420 as part of adapted 3D model 130 and saves adapted 3D surface model 130 to the memory unit. In some embodiments, rendering engine 110 may complete adapted 3D model 130 and cause the finalized adapted 3D model 130 to be transmitted to a 3D printer. In some embodiments, the 3D printer can print the finalized adapted 3D model 130 with different characteristics for each of the distinct surface regions. Once rendering engine 110 completes the adapted 3D model 130, method 600 ends at step 621.

In sum, a rendering engine produces an adapted non-manifold 3D surface model based on Boolean combinations of two or more 3D objects. More specifically, the rendering engine joins at least two 3D objects that have closed surface meshes defined by surface boundaries to form non-regularized Boolean model having a non-manifold surface mesh. An intersection engine computes a set of intersection contours between the closed surface meshes forming the non-manifold surface mesh of the non-regularized Boolean model and removes portions of the surface meshes surrounding the intersection contours. The removal of the portions of the surface meshes by the intersection engine creates a set of boundaries. A mesh evolution engine evolves each boundary towards the other boundaries and the locations of the intersection contours. As the boundaries extend towards each other, a gap engine smooths each individual surface mesh to maintain a consistent polygonal mesh throughout the non-regularized Boolean model. The rendering engine produces an adapted 3D surface model that has an adapted non-manifold surface mesh once the mesh evolution engine and gap engine close all the gaps between the sets of boundaries. The adapted non-manifold surface mesh of the adapted 3D surface model includes at least two distinct regions, including an interior region and an exterior region.

Notably, a user can assign different properties to each of the distinct regions included in the adapted 3D surface model. For example, a designer can designate that a 3D printer manufacture a single physical article from the adapted 3D surface model without having to separate the adapted 3D surface model into multiple 3D surface sub-models. A 3D printer can then manufacture the adapted 3D surface model as a single physical article that includes multiple, distinct regions. Each of the distinct regions can have different properties, where the 3D printer manufactures the region using a different material and/or a different color.

At least one advantage of the disclosed technique is that the rendering engine enables a 3D graphics application to perform Boolean operations on a broader range of 3D objects. The rendering engine removes and evolves portions of surface boundaries individual 3D objects, which avoid misalignments between surface meshes of multiple 3D objects. The rendering engine also evolves internal surface boundaries of a non-manifold mesh of a non-regularized Boolean model, which enables a 3D graphics application to generate an adapted 3D surface model as an adapted non-manifold surface mesh that includes designated internal and external regions. Maintaining designated internal regions for an adapted non-manifold surface mesh enables a designer to provide distinct characteristics to internal regions of an adapted 3D surface model. An adapted 3D surface model with multiple designated regions provides a designer the ability to produce more varied 3D surface models than available through conventional Boolean operations on 3D surface models.

1. In some embodiments, a computer-implemented method for generating a three-dimensional (3D) surface model comprises joining a first 3D object having a first closed surface mesh and a second 3D object having a second closed surface mesh to produce a first irregular surface mesh; computing a first intersection contour for the first irregular surface mesh; removing at least one portion of the first irregular surface mesh proximate to the first intersection contour to produce a first boundary; growing the first boundary towards at least one other boundary; and connecting the first boundary to the at least one other boundary to produce a portion of a first non-manifold surface mesh that comprises at least a portion of the 3D surface model.

2. The computer-implemented method of clause 1, where the first non-manifold surface mesh includes at least one exterior surface mesh defining an exterior surface region; and at least two distinct interior surface meshes defining an interior surface region.

3. The computer-implemented method of clause 1 or 2, where at least one of the distinct interior surface meshes and the at least one exterior surface mesh define the exterior surface region.

4. The computer implemented method of any of clauses 1-3, where the exterior surface region is associated with a first material and the interior surface region is associated with a second material.

5. The computer-implemented method of any of clauses 1-4, which further comprises causing the first non-manifold surface mesh to be transmitted to a 3D printer, where the 3D printer prints the first non-manifold surface mesh using the first material and the second material.

6. The computer-implemented method of any of clauses 1-5, where the first non-manifold surface mesh includes a plurality of exterior surface regions.

7. The computer-implemented method of any of clauses 1-6, which further comprises removing at least one of the plurality of exterior surface regions from the first non-manifold surface mesh.

8. The computer-implemented method any of clauses 1-7, where closing the first boundary comprises determining that a first gap between the first boundary and the at least one other boundary is below a gap threshold; after determining that the first gap is below the gap threshold, matching first vertices of a first polygonal mesh associated with the first boundary to second vertices of a second polygonal mesh associated with the at least one other boundary.

9. The computer-implemented method of any of clauses 1-8, which further comprises computing a second intersection contour for the first irregular surface mesh; removing at least one portion of the first irregular Boolean surface mesh proximate to the second intersection contour to produce a second boundary; and growing the second boundary towards at least one other open boundary, where the first boundary and the second bound grow substantially in parallel with each other.

10. In some embodiments, a non-transitory computer-readable storage medium including instructions that, when executed by a processor, cause the processor to generate a three-dimensional (3D) surface model by performing the steps of joining a first 3D object having a first closed surface mesh and a second 3D object having a second closed surface mesh to produce a first irregular surface mesh; computing a first intersection contour for the first irregular surface mesh; removing at least one portion of the first irregular surface mesh proximate to the first intersection contour to produce a first boundary; growing the first open boundary towards at least one other boundary; and connecting the first open boundary to the at least one other boundary to produce a portion of a first non-manifold surface mesh that comprises at least a portion of the 3D surface model.

11. The non-transitory computer-readable medium of clause 10, where computing the first intersection contour comprises determining an intersecting set, the intersecting set, including a set of vertices, where each vertex in the set of vertices is common to the first closed surface mesh and the second closed surface mesh, and a set of edges, where each edge in the set of edges is common to the first closed surface mesh and the second closed surface mesh.

12. The non-transitory computer-readable medium of clause 10-11, where removing at least one portion of the first irregular surface mesh comprises removing the intersecting set; and removing at least one face neighboring a vertex or an edge of the intersecting set.

13. The non-transitory computer-readable medium of clauses 10-12, which further comprises instructions that, when executed by a processor, cause the processor to further perform the step of generating a target intersection contour based on at least the first boundary and the at least one other boundary.

14. The non-transitory computer-readable medium of clauses 10-13, where connecting the first boundary and to the at least one other open boundary comprises determining that a first gap between the first boundary and the at least one other boundary is below a gap threshold; after determining that the first gap is below the gap threshold, matching first vertices of a first polygonal mesh associated with the first boundary to second vertices of a second polygonal mesh associated with the at least one other boundary; and combining the first vertices of the first polygonal mesh and the second vertices of the second polygonal mesh to the portion of the second non-manifold surface mesh.

15. The non-transitory computer-readable medium of clauses 10-14, where the second non-manifold surface mesh includes at least one exterior surface mesh defining an exterior surface region; and at least two distinct interior surface meshes defining an interior surface region.

16. The non-transitory computer-readable medium of clauses 10-15, where at least one of the distinct interior surface meshes and the at least one exterior surface mesh define the exterior surface region.

17. The non-transitory computer-readable medium of clauses 10-16, where the irregular mesh comprises a non-regularized Boolean surface mesh.

18. The non-transitory computer-readable medium of clauses 10-17, where the second non-manifold surface mesh includes a plurality of exterior surface regions.

19. The non-transitory computer-readable medium of clauses 10-18, which further comprises instructions that, when executed by a processor, cause the processor to further perform the step of removing at least one of the plurality of exterior surface regions from the second non-manifold surface mesh.

20. In some embodiments, a system comprises a memory storing an application; and a processor that is coupled to the memory and, when executing the application, is configured to join a first 3D object having a first closed surface mesh and a second 3D object having a second closed surface mesh to produce a first irregular surface mesh, compute a first intersection contour for the first irregular surface mesh, remove at least one portion of the first irregular surface mesh proximate to the first intersection contour to produce a first boundary, grow the first boundary towards at least one other open boundary, and connect the first boundary to the at least one other open boundary to produce a portion of a first non-manifold surface mesh that comprises at least a portion of a 3D surface model.

Any and all combinations of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a ""module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semi-conductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for generating a three-dimensional (3D) surface model, the method comprising:
   joining a first 3D object having a first closed surface mesh and a second 3D object having a second closed surface mesh to produce a first irregular surface mesh;
   computing an intersection contour between the first closed surface mesh and the second closed surface mesh;
   removing at least one portion of the first irregular surface mesh proximate to the intersection contour to produce a first boundary;
   advancing the first boundary towards at least one other boundary; and
   connecting the first boundary to the at least one other boundary to produce a first non-manifold surface mesh that comprises at least a portion of the 3D surface model, wherein the first non-manifold surface mesh includes an interior surface region that defines an interior volume of the 3D surface model.

2. The computer-implemented method of claim 1, wherein the first non-manifold surface mesh comprises a first surface region having a first set of characteristics and a second surface region having a second set of characteristics that is independent from the first set of characteristics.

3. The computer-implemented method of claim 1, wherein the first non-manifold surface mesh comprises a first surface region that is assigned a first material and a second surface region that is assigned a second material that is different from the first material.

4. The computer-implemented method of claim 1, wherein the first non-manifold surface mesh comprises a first surface region that is assigned a first color and a second surface region that is assigned a second color that is different from the first color.

5. The computer-implemented method of claim 1, wherein the first non-manifold surface mesh further includes an exterior surface region.

6. The computer-implemented method of claim 1, wherein the first non-manifold surface mesh comprises a consistent surface mesh between a first surface region and a second surface region of the 3D surface model.

7. The computer-implemented method of claim 1, further comprising causing the first non-manifold surface mesh to be transmitted to a 3D printer that prints the first non-manifold surface mesh.

8. One or more non-transitory computer-readable media storing program instructions that, when executed by one or more processors, cause the one or more processors to generate a three-dimensional (3D) surface model by performing the steps of:
   joining a first 3D object having a first closed surface mesh and a second 3D object having a second closed surface mesh to produce a first irregular surface mesh;
   computing an intersection contour between the first closed surface mesh and the second closed surface mesh;
   removing at least one portion of the first irregular surface mesh proximate to the intersection contour to produce a first boundary;
   advancing the first boundary towards at least one other boundary; and
   connecting the first boundary to the at least one other boundary to produce a first non-manifold surface mesh that comprises at least a portion of the 3D surface model, wherein the first non-manifold surface mesh includes an interior surface region that defines an interior volume of the 3D surface model.

9. The one or more non-transitory computer-readable media of claim 8, wherein the first non-manifold surface mesh comprises a first surface region having a first set of characteristics and a second surface region having a second set of characteristics that is independent from the first set of characteristics.

10. The one or more non-transitory computer-readable media of claim 8, wherein the first non-manifold surface mesh comprises a first surface region that is assigned a first material and a second surface region that is assigned a second material that is different from the first material.

11. The one or more non-transitory computer-readable media of claim 8, wherein the first non-manifold surface mesh comprises a first surface region that is assigned a first color and a second surface region that is assigned a second color that is different from the first color.

12. The one or more non-transitory computer-readable media of claim 8, wherein the first non-manifold surface mesh further includes an exterior surface region.

13. The one or more non-transitory computer-readable media of claim 8, wherein the first non-manifold surface mesh comprises a consistent surface mesh between a first surface region and a second surface region of the 3D surface model.

14. A system comprising:
   a memory storing an application; and
   a processor that is coupled to the memory and, when executing the application, is configured to generate a three-dimensional (3D) surface model by performing the steps of:
      joining a first closed surface mesh and a second closed surface mesh to produce a first irregular surface mesh;
      computing an intersection contour between the first closed surface mesh and the second closed surface mesh;

removing at least one portion of the first irregular surface mesh proximate to the intersection contour to produce a first boundary set;

connecting a first boundary in the first boundary set to at least one other boundary in the first boundary set to produce a first non-manifold surface mesh that comprises at least a portion of the 3D surface model, wherein the first non-manifold surface mesh includes an interior surface region that defines an interior volume of the 3D surface model.

15. The system of claim 14, wherein the first non-manifold surface mesh comprises a consistent surface mesh between a first surface region and a second surface region of the 3D surface model.

16. The system of claim 15, wherein the first surface region is assigned a first material and the second surface region is assigned a second material that is different from the first material.

\* \* \* \* \*